T. S. HANSON & O. KNUTSON.
SUPPORT FOR CREAM SEPARATOR STRAINERS.
APPLICATION FILED NOV. 24, 1917.
1,275,678.
Patented Aug. 13, 1918.
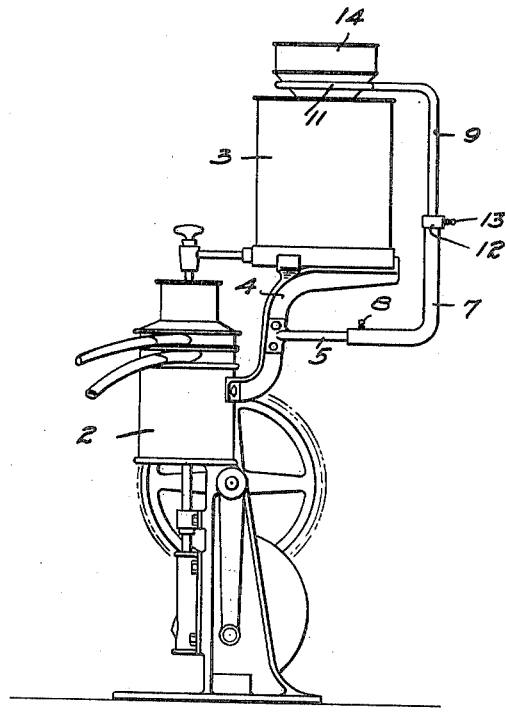
FIG. 1.
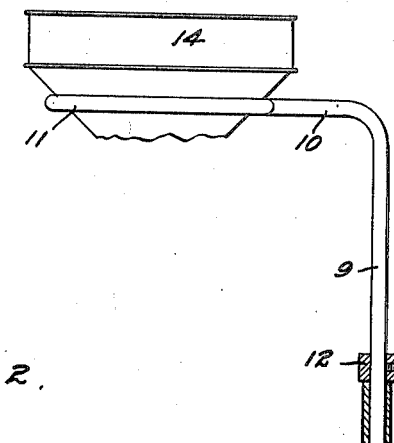
FIG. 2.
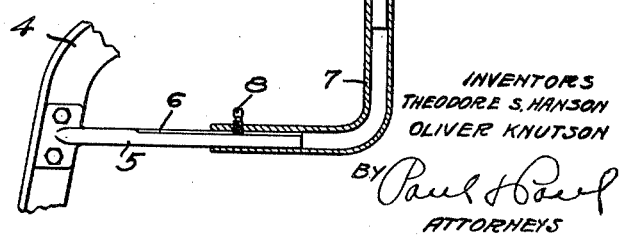

UNITED STATES PATENT OFFICE.

THEODORE S. HANSON AND OLIVER KNUTSON, OF NORTHWOOD, IOWA.

SUPPORT FOR CREAM-SEPARATOR STRAINERS.

1,275,678. Specification of Letters Patent. Patented Aug. 13, 1918.

Application filed November 24, 1917. Serial No. 203,773.

*To all whom it may concern:*

Be it known that we, THEODORE S. HANSON and OLIVER KNUTSON, citizens of the United States, residents of Northwood, county of Worth, State of Iowa, have invented certain new and useful Improvements in Supports for Cream-Separator Strainers, of which the following is a specification.

In straining milk into a separator, it has been customary to hold the strainer in one hand while the milk is poured with the other, and it is often difficult to do this when the top of the milk receptacle is a considerable distance above the floor or the can of milk is large and heavy. Another method has been to strain the milk into separate cans on the floor and then pour the milk into the separator. This operation requires extra cans and causes considerable confusion. The object of our invention, therefore, is to provide a support for a milk strainer by means of which the strainer may be held in place over the separator, leaving both hands of the operator free to handle the milk can. When the strainer is not in use, it may be swung around to one side away from the milk receptacle.

A further object is to provide a strainer support which can be easily and conveniently adjusted for different positions and different sizes of receptacle.

The invention consists generally in various constructions and combinations, all as hereinafter described and particularly pointed out in the claims.

In the accompanying drawings forming part of this specification,

Figure 1 is a side elevation of a separator with our invention applied thereto,

Fig. 2 is a detail view, illustrating the adjustable means for supporting the strainer.

In the drawing, 2 represents a cream separator of ordinary construction, having a milk receptacle 3 supported by a bracket 4 which extends upwardly above the separator to a point where the milk from the receptacle may be conveniently supplied to the separator. On this bracket 4 I secure an outwardly projecting rod 5 having a key-seat 6 formed thereon. An angular member 7 of a suitable tubing is provided to telescope with the rod 5 and is provided with a set screw 8 to enter the key-seat 6 and prevent the tube from rotating thereon but permitting it to slide freely back and forth to move the tubular member toward or from the supporting bracket. An upright rod 9 is provided to telescope with the upper end of the tubular member 7 and has a horizontal part 10 at its upper end provided with a loop 11. The upright part of said rod has a collar 12 and a set screw 13 for securing the collar in place, said collar resting on the upper end of the tube 7 and holding the rod against downward movement, but permitting its adjustment to accommodate the loop to the height of the top of the milk receptacle. This rod is free to rotate on a vertical axis in the tube so that the rod can be positioned over the receptacle or swung to one side, as may be desired.

A milk strainer 14 is fitted within the loop 11 and depends into the open end of the milk receptacle in the usual way, so that the can of milk may be raised and poured into the strainer without the necessity of the operator grasping the strainer for the purpose of holding it in place while the milk is being poured. When the straining operation is completed, the strainer, with the supporting arm, may be raised and swung to one side until the straining operation is to be repeated.

In various ways the details of construction herein shown and described may be modified and still be within the scope of our invention.

We claim as our invention:

1. A strainer support for a cream separator comprising a rod projecting outwardly form the separator, an angular member mounted to slide horizontally on said rod and having an upright portion, and a strainer supporting rod mounted for rotary and vertical movement in said angular member and having a part to project over the milk receptacle and support a strainer thereon.

2. A strainer support for a cream separator comprising a rod projecting horizontally from the separator, a tubular member having a horizontal part slidable on said rod and an upwardly projecting part, a rod mounted to telescope with said upwardly projecting part and having a collar secured thereon for resting on the upper end of said upwardly projecting part and supporting said rod thereon while permitting it to rotate freely, the upper end of said rod having a horizontally projecting loop to extend over the milk receptacle and form a support for a strainer, the mounting of said tubular member and said rod permitting horizontal and vertical adjustment to adapt them for milk receptacles of different sizes.

3. A strainer support for a cream separator comprising a member projecting outwardly from the separator and having an upright portion, and a strainer supporting rod mounted for rotary and vertical movement in said upright portion, the upper end of said strainer supporting rod having a horizontally projecting loop to extend over the milk receptacle and form a support for a strainer, the vertical and rotary movement of said strainer supporting rod permitting horizontal and vertical adjustment to adapt it for milk receptacles of different sizes.

In witness whereof, we have hereunto set our hands this 10th day of October, 1917.

THEODORE S. HANSON.
OLIVER KNUTSON.

Witnesses:
C. BOLENDER,
C. H. DWELLE.